United States Patent
Froehlich et al.

(10) Patent No.: US 7,214,399 B2
(45) Date of Patent: May 8, 2007

(54) SHELF STABLE VEGETABLE COMPOSITION AND METHOD OF MAKING

(75) Inventors: Markus Froehlich, Zurich (CH); Ernst Isler-Sieber, Felben-Wellhausen (CH); Walter Penaloza Izurieta, Zumikon (CH)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 10/877,250

(22) Filed: Jun. 24, 2004

(65) Prior Publication Data

US 2005/0003053 A1 Jan. 6, 2005

Related U.S. Application Data

(63) Continuation of application No. PCT/EP02/14819, filed on Dec. 18, 2002.

(30) Foreign Application Priority Data

Dec. 25, 2001 (EP) ................... 01205157

(51) Int. Cl.
*A23B 7/154* (2006.01)
*A23L 1/212* (2006.01)

(52) U.S. Cl. ............... 426/268; 426/270; 426/310; 426/321; 426/615

(58) Field of Classification Search ............ 426/262, 426/267, 268, 270, 310, 321, 615
See application file for complete search history.

(56) References Cited

U.S. PATENT DOCUMENTS

| | | | | |
|---|---|---|---|---|
| 4,572,836 A | | 2/1986 | Bakal | 426/321 |
| 4,832,969 A | * | 5/1989 | Lioutas | 426/270 |
| 5,702,750 A | * | 12/1997 | Darbonne | 426/615 |
| 5,858,446 A | | 1/1999 | Lewis et al. | 426/615 |
| 5,925,395 A | | 7/1999 | Chen | 426/321 |
| 6,210,730 B1 | * | 4/2001 | Mitchell | 426/312 |
| 2003/0033939 A1 | | 2/2003 | Mahe et al. | 99/345 |

FOREIGN PATENT DOCUMENTS

| | | |
|---|---|---|
| EP | 0087717 A1 | 9/1983 |
| EP | 0 940 090 A1 | 9/1998 |
| EP | 1 010 368 A1 | 6/2000 |
| GB | 2 014 429 A | 8/1979 |

* cited by examiner

*Primary Examiner*—Arthur L. Corbin
(74) *Attorney, Agent, or Firm*—Bell, Boyd & Lloyd LLP

(57) ABSTRACT

The present invention relates to a shelf stable vegetable composition that includes a vegetable having a green color and a water-soluble compound in an amount sufficient to impart to the composition a water activity of 0.65 or less and a pH of 6.5 to 7.5 at ambient conditions for preservation of the green color of the vegetable. Advantageously, the water-soluble compound is present in an amount to preserve the green color of the vegetable for at least 6 months, and to impart a water activity of 0.6 to 0.65. The invention also relates to a method for increasing shelf stability of a vegetable composition that includes a vegetable having a green color, by adding effective amounts of such water-soluble compounds thereto.

15 Claims, No Drawings

SHELF STABLE VEGETABLE COMPOSITION AND METHOD OF MAKING

CROSS-REFERENCE TO RELATED APPLICATIONS

This application is a continuation of International application PCT/EP02/14819 filed Dec. 18, 2002, the entire content of which is expressly incorporated herein by reference thereto.

BACKGROUND

The present invention relates to vegetables and herbs and particularly to a method for the preservation of such foodstuffs.

Vegetables and herbs are widely used in processed-foods because of their taste and flavor properties. Besides the flavoring properties, vegetables and herbs are useful to impart a nice and pleasant colored aspect to food products. Herbs are used in the composition of numerous traditional dishes and the aroma and color of various specific herbs are of great importance in these.

Thus, basil, olives, tomato, bell pepper, garlic, onion, carrot, coriander or mint, for example, do not only impart a pleasant typical flavor but also an attractive color. Since herbs are seasonal and particularly sensitive to spoilage because of their high water content they are mainly found in dried form. However, most herbs and vegetables when dried, lose their green color. Aroma and flavor are also irreversibly altered so that they do not represent satisfactory alternative to freshly picked herbs.

"Freshness" is a universal quality issue with processed foods and this is of particular interest for herbs and vegetables because such products inherently refer to freshness. Regarding herbs, the green color aspect is considered as a key factor for assessment of this freshness and because of all the processes that herbs may be subjected to, the green color is quite often adversely affected.

The chemical basis for the loss of bright green color of fresh vegetables and herbs has been extensively studied. Thus, chlorophyll, which is responsible for this bright green color degrades during thermal processing such as drying, for example. However, in non heat-treated food products, the green color is also dictated by the chemical stability of the chlorophyll which has been shown to be acid sensitive and to have its maximal stability and therefore its maximal green color aspect at pH of about 7 and slightly above.

In the particular case of culinary applications, herbs and/or vegetables are intimately mixed or ground. Mixing or grounding even accelerate spoilage. The product can therefore not be stored for a long time without any preservatives.

Microbial stabilization may be achieved by lowering the pH by addition of acids and/or lowering the water activity (Aw) thanks to addition of salts as well as addition of anti-microbial additives like sulfites or sorbate.

Dehydrated products have a typical Aw of about 0.2 to 0.3 and are therefore microbiologically stable since no organisms can grow at Aw below about 0.6 to 0.65. At Aw higher than about 0.6 to 0.65, microbial growth can occur causing spoilage, formation of off-odors as well as infection with pathogenic microorganisms and/or toxins. Since the perception of freshness in ambient stable products may be obtained at Aw of about 0.6 to 0.65, the prevention of microbial growth may be achieved by addition of preservatives and/or reduction of pH. But, as said before, chlorophyll is not stable anymore and therefore the green color disappears at acidic pH.

Some attempts have been made to obtain shelf stable vegetables or herbs with improved color. U.S. Pat. No. 5,858,446 relates to fresh herbs with bright and fresh color that can be used for culinary applications and that can be stored for protracted periods. It is taught that the leaves of aromatic plants are mixed in the absence of oxygen with either a salt and/or an oxygen scavenging agent in order to obtain a water activity of the mixture below 0.9.

European patent no. 87,717 discloses a dried vegetable product manufacturing process in which a plant is stabilized by heating and addition of electrolyte before drying with a carrier.

U.S. Pat. No. 4,832,969 discloses dried green vegetables with superior color retention. The manufacture of such dried vegetables comprises the steps of blanching the pieces of vegetables in a bath having a pH of about 7 to 9, infusing the blanched vegetable pieces in a solution comprising sugar alcohol, sugar and bittering agents such KCl or $MgCl_2$ and finally drying the vegetable pieces to an Aw of 0.3 to 0.85.

All these prior art technologies are complicated and involve the use of various chemical preservatives that are not always well perceived by the consumer. Moreover, these prior technologies refers to dried products that do not bring the freshness to the consumer. Therefore, there remains a need for shelf stable herbs or vegetables compositions that exhibit a bright and attractive green color.

SUMMARY OF THE INVENTION

Accordingly, the present invention now provides a shelf stable vegetable composition comprising a vegetable having a green color and a water-soluble compound in an amount sufficient to impart to the composition a water activity of 0.65 or less and a pH of 6.5 to 7.5 at ambient conditions for preservation of the green color of the vegetable. Advantageously, the water-soluble compound is present in an amount to preserve the green color of the vegetable for at least 6 months, and to impart a water activity of 0.6 to 0.65.

Preferably, the water-soluble compound is an organic acid salt, such as an acetate salt, ascorbate salt, aspartate salt, citrate salt, fumarate salt, malate salt, tartrate salt, succinate salt, lactate salt or a combination thereof. The water-soluble compound may also be a phosphate salt, potassium or sodium acetate. The water-soluble compound may also be combined with at least one other Aw decreasing compound that is not an organic acid salt, such as KCl, NaCl or a combination thereof. The composition may further comprise at least one humectant, such as a polyol or polydextrose, a reducing sugar, glycerol or propan-1,2-diol.

The invention also relates to a method for increasing shelf stability of a vegetable composition that includes a vegetable having a green color, which comprises adding a water-soluble compound in an amount sufficient to impart to the composition a water activity of 0.65 or less and a pH of 6.5 to 7.5 at ambient conditions for preservation of the green color of the vegetable.

DETAILED DESCRIPTION OF THE PREFERRED EMBODIMENTS

In the present description, the term "vegetable composition" refers to any edible foodstuff made from vegetable either in pieces, in purée, minced or chopped. Vegetables in pieces may either refer to vegetables of small size in its integrity or vegetables which have been cut to a size suitable for food industry.

The term "vegetable" refers to any plant material used in food industry. As plant material, one may cite either leaves, roots, fruits, stalk or seeds. Vegetables that are suitable for the present invention include herbs like basil, coriander, oregano, tarragon, mint, parsley, chives, anise, as well as other aromatic and non aromatic vegetables like bell peppers, broccoli, lettuce, peas, zucchini, celery, and the like.

The expression "ambient conditions" refers to ambient temperature and pressure values, namely about 10–30° C., preferably 15–25° C., typically about 20° C., and atmospheric pressure, typically about 1 bar.

It has surprisingly been found that the addition of a single water-soluble compound in suitable amount to the vegetable composition allows in the same time to reduce the Aw as well as adjust the pH to a value compatible with chlorophyll stability, namely around 7.

It is believed that this is the very first time the use of a single water-soluble compound has been used for both decreasing the Aw and adjusting the pH at a value of about 6.5 to 7.5 in order to stabilize and preserve the green color of vegetable composition is disclosed. Thus, thanks to the ability of the soluble compound to reduce the Aw to a value below or equal about 0.65, preferably to a value of about 0.6 to 0.65, the shelf stability of the vegetable composition according to the invention is obtained without the use of any additional preservatives.

Suitable water-soluble compounds for the manufacture of the vegetable compositions according to the present invention may be any food acceptable organic acid which behaves as a base when deprotonated, namely when present in the salt form. Suitable organic acids salts may be selected from the group comprising acetate salts, ascorbate salts, aspartate salts, citrate salts, fumarate salts, malate salts, tartrate salts, succinate salts and lactate salts as well as phosphate salts and carbonate or bicarbonate salts used alone or in combination. The present invention being based on the finding that a single organic acid can, in the same time, reduce Aw as well as adjust the pH, a combination of several suitable organic acids salts may also be envisaged.

The organic acids salts that are suitable for the vegetable composition according to the invention may be potassium or sodium salts. According to a preferred embodiment of the present invention the soluble compound is an acetate salt such as potassium acetate. Indeed, potassium acetate at saturation level can reduce the Aw to 0.23 at 20° C. Acetic acid shows a pKa value of about 4.5 and thus behave as a soft base above this value. The deprotonated acetate salt in solution exhibits a pH value of up to about 6.5 to 9.

If desired, the water-soluble compound used according to the present invention may be combined with another Aw decreasing compounds like electrolytes such as NaCl or KCl for example or polyols such as glycerol. The vegetable composition according to the present invention does not need any extra heat treatment for stabilization.

The vegetable composition according to the present invention presents a flavor and aroma profile quite identical to a fresh one. In the case of a herb composition, it exhibits not only the freshness, the full aroma and flavor of the freshly prepared picked herbs but also the typical bright green color of such products. The vegetable composition may be in the form of minced leaves of herbs that can be used upon need for the aromatization of meal or the composition of dishes necessitating the aroma and flavor of fresh herbs.

The vegetable composition according to the present invention may be used in any type of food products provided that the Aw is not disturbed. The vegetable composition according to the present invention may thus be included in culinary compositions such as bouillon tablets, cooking aid tablets, dehydrated bouillon, soups or sauces but also in cooking aid in the form of tablets. One particularly interesting application of the vegetable composition according to the present invention concerns the cooking aid as exposed in the US patent application 2003/033939, the entire content of which is expressly incorporated herein by reference thereto.

The vegetable composition according to the present invention may also be used as such, or as a separately packed ingredient for soups, or as an ingredient for frozen compositions such as frozen vegetable mixtures. The composition according to the present invention may also be comprised in spoonable and portionable products comprising minced or chopped fresh herbs ready for dispensing whether into a meal or a plate. However, for such applications, since the composition should be contained in a container to be opened several times, there may be a risk of crystallization of organic salts that would be detrimental to consumer acceptance and convenience.

Accordingly, in order to prevent dehydration of the composition and the subsequent crystallization of organic acid salts as well as to ensure its easy portionability, the composition according to the present invention may comprise at least one humectant selected in the group comprising polyols, and polydextrose. Polyols may be selected from the group comprising reduced sugars. Suitable reducing sugars may preferably be selected in the group comprising sorbitol or manitol. Suitable polyols may be selected in the group comprising glycerol or Propan-1,2-diol for example. Indeed, the addition of glycerol, for example, prevents from dehydration and therefore permits to obtain a spoonable and easily portionable product in which organic acid salts remain non crystallized, and of course keep a fresh, brilliant and attractive appearance. The quantity of polyol may range from 1% to 60%, preferably from about 10% to 40% based on the total weight of the composition according to the invention.

The vegetable composition according to the present invention is shelf stable at ambient or room temperature for at least six months and keeps the typical green color all along the storage time at ambient or room temperature providing that the pH does not fall below about 6.5 to 7.5 because the chlorophyll would go on degradation and the green color would then disappear.

EXAMPLE

Fresh Green Herbs and Onion Puree

The following ingredients (% in weight) are added in a tank with a cutter and a stirrer thermostated at 25° C.: NACL 31% Potassium acetate 13% Sodium Glutamate 11% Modified starch 0.4% Onion purée 27% Basil 6.6% Water 11% The onion puree consists of pasteurized finely ground onions. Basil consists of fresh basil leaves washed and drained.

The whole mixture is mixed for 10 minutes and filled in pots. It exhibits the typical aroma of basil and onion and the basil leave particles show the fresh bright green color similar to fresh leaves. The Aw of the basil/onion puree is 0.65 and the pH is 7.26. This composition may be kept at ambient temperature for seven months without any substantial loss of aroma or modification of color.

What is claimed is:

1. A shelf stable vegetable composition comprising a non-dehydrated vegetable having a green color and a water-soluble compound in an amount sufficient to impart to the composition a water activity of 0.65 or less and a pH of 6.5 to 7.5 at ambient conditions for preservation of the green color of the vegetable, wherein the water-soluble compound is an organic acid salt selected from the group consisting of acetate salt, aspartate salt, fumarate salt, malate salt, tartrate salt, succinate salt, lactate salt, and combinations thereof.

2. The composition of claim 1, wherein the water-soluble compound is present in an amount to preserve the green color of the vegetable for at least 6 months.

3. The composition of claim 1, wherein the water-soluble compound is present in an amount to impart a water activity of 0.6 to 0.65.

4. The composition of claim 1, wherein the water-soluble compound is potassium or sodium acetate.

5. The composition of claim 1, wherein the water-soluble compound is combined with at least one other Aw decreasing compound that is not an organic acid salt.

6. The composition of claim 5, wherein the Aw decreasing compound is KCl, NaCl or a combination thereof.

7. The composition of claim 1, which further comprises at least one humectant.

8. The composition of claim 7, wherein the humectant is a polyol or polydextrose, a reducing sugar, glycerol or propan-1,2-diol.

9. A method for increasing shelf stability of a vegetable composition that includes a non-dehydrated vegetable having a green color, which comprises adding a water-soluble compound in an amount sufficient to impart to the composition a water activity of 0.65 or less and a pH of 6.5 to 7.5 at ambient conditions for preservation of the green color of the vegetable, wherein the water-soluble compound is an organic acid salt selected from the group consisting of acetate salt, aspartate salt, fumarate salt, malate salt, tartrate salt, succinate salt, lactate salt, and combinations thereof.

10. The method of claim 9, wherein the water-soluble compound is present in an amount to preserve the green color of the vegetable for at least 6 months at ambient conditions.

11. The method of claim 9, wherein the water-soluble compound is present in an amount to impart a water activity of 0.6 to 0.65.

12. The method of claim 9, wherein the water-soluble compound is potassium or sodium acetate.

13. The method of claim 9, wherein the water-soluble compound is combined with at least one other Aw decreasing compound that is not an organic acid salt.

14. The method of claim 13, wherein the Aw decreasing compound is KCl, NaCl or a combination thereof.

15. The method of claim 9, which further comprises adding at least one humectant to the composition, wherein the humectant is a poiyoi, polydextrose, a reducing sugar, glycerol or propan-1,2-diol.

* * * * *